United States Patent [19]

Watanabe

[11] 3,750,026

[45] July 31, 1973

[54] INTERSYMBOL INTERFERENCE COMPONENT ELIMINATING SYSTEM

[75] Inventor: Kazuhisa Watanabe, Tokyo, Japan

[73] Assignee: Nippon Telegraph and Telephone Public Corporation, Tokyo, Japan

[22] Filed: July 24, 1972

[21] Appl. No.: 274,739

[30] Foreign Application Priority Data

July 27, 1971 Japan .............................. 46/56263

[52] U.S. Cl. .................................. 325/321, 333/18

[51] Int. Cl. ............................................ H04b 1/16

[58] Field of Search ................. 325/42, 321; 333/18

[56] References Cited

UNITED STATES PATENTS 3,617,635 11/1971 Hirsch ................................. 333/18

3,659,229 4/1972 Milton ................................. 333/18

*Primary Examiner*—Albert J. Mayer

*Attorney*—Marshall & Yeasting

[57] ABSTRACT

An intersymbol interference component eliminating system having a demodulator supplied with a carrier wave to demodulate an amplitude modulated digital symbol synchronized with a timing signal, and an intersymbol interference component eliminating circuit including a delay line supplied with a demodulated digital symbol derived from the demodulator, a weighting circuit $A_j (j = n, -(n-1), \ldots -1, 0, +1, \ldots +(n-1)$ and $+n)$ supplied with an output derived from a terminal $Q_j$ of the delay line, a circuit for summing outputs of the weighting circuits and a circuit for generating a weight coefficient control signal $D_j$ based on the output of the summing circuit and the timing signal, the circuit $A_j$ being controlled in its weight coefficient $C_j$ by the signal $D_j$, in which circuits are provided for generating carrier wave and timing signal phase control signals respectively based on the signals $D_{-n}, D_{-(n-1)}, \ldots D_{-1}, D_{+1}, \ldots D_{+(n-1)}$ and $D_{+n}$, the carrier wave and timing signal phase control signals corresponding to $$\Delta I_C = \sum_{\substack{k=-n \\ \neq 0}}^{+n} \frac{C_k}{\alpha_{kC}} \text{ and } \Delta I_T = \sum_{\substack{k=-n \\ \neq 0}}^{+n} \frac{C_k}{\alpha'_{kC}}$$

respectively $(k = -n, -(n-1), \ldots -1, +1, \ldots +(n-1)$ and $+n)$ and $\alpha_{k_C}$ and $\alpha'_{k_C}$ being predetermined weight coefficients corresponding to the coefficient $C_k$ in the case where only the phases of the carrier wave and the timing signal shift by predetermined amounts respectively, and circuits are provided for shifting the phases of the carrier wave and the timing signal based on the carrier wave and timing signal phase control signals respectively.

4 Claims, 8 Drawing Figures

PATENTED JUL 31 1973 3,750,026

INTERSYMBOL INTERFERENCE COMPONENT ELIMINATING SYSTEM

BACKGROUND OF THE INVENTION

1. Field of the Invention

This invention relates to an intersymbol interference component eliminating system, and more particularly to an improved system for eliminating or removing intersymbol interference components from a sequence of demodulated digital symbols which are obtained by the demodulation of an amplitude modulated signal, the amplitude modulated signal being obtained by the amplitude modulation of a carrier wave with a digital signal composed of at least a sequence of digital symbols synchronized with a sequence of timing signals.

2. Description of the Prior Art

The sequence of demodulated digital symbols are produced by applying the amplitude modulated signal and a carrier wave to a demodulator, the carrier wave being extracted from the amplitude modulated signal. There are some occasions when intersymbol interference components are contained in the sequence of demodulated digital symbols. One of the reasons therefor is that the phase of the extracted carrier wave supplied to the demodulator shifts. To avoid this, it is considered desirable to construct carrier wave extracting means so that the phase of the carrier wave derived therefrom may not shift. However, this method leads to complexity, bulkiness and expensiveness of the carrier wave extracting means and also encounters with a difficulty in completely preventing phase shift of the extracted carrier wave.

Therefore, in the prior art, the sequence of demodulated digital symbols are supplied to an intersymbol interference component eliminating circuit which is controlled by the sequence of timing signals. With such an intersymbol interference component eliminating circuit, however, it is considerably difficult to effect complete elimination or removal of the intersymbol interference components contained in the sequence of demodulated digital symbols, especially in the case of a large amount of them being contained therein. In this case, the intersymbol interference eliminating circuit is controlled by the sequence of timing signals but where a phase shift occurs in the sequence of timing signals complete elimination of the intersymbol interference components is also impossible and the intersymbol interference components still remain in the sequence of digital symbols derived from the intersymbol interference component eliminating circuit. To avoid this, it is considered to arrange such that no phase shift occurs in the sequence of timing signals but this method also results in complexity, bulkiness and expensiveness of a timing signal transmission system or a timing signal reproducing circuit and cannot completely prevent phase shift of the sequence of timing signals.

SUMMARY OF THE INVENTION

Accordingly, one object of this invention is to provide an improved intersymbol interference component eliminating system which employs simple and inexpensive carrier wave extracting means and by which intersymbol interference components based on phase shift of a carrier wave supplied to a demodulator can be effectively eliminated or removed from a sequence of demodulated digital symbols.

Another object of this invention is to provide an improved intersymbol interference component eliminating system which employs a simple and inexpensive timing signal transmission system or timing signal reproducing means and by which intersymbol interference components based on phase shift of a sequence of timing signals can be effectively eliminated or removed from a sequence of demodulated digital symbols.

Other objects, features and advantages of this invention will become apparent from the following description taken in conjunction with the accompanying drawings.

DESCRIPTION OF THE PREFERRED EMBODIMENTS

To facilitate a better understanding of this invention, a description will be given first of a conventional system for eliminating intersymbol interference components from a sequence of digital symbols in connection with FIGS. 1 to 5.

Figure 1:
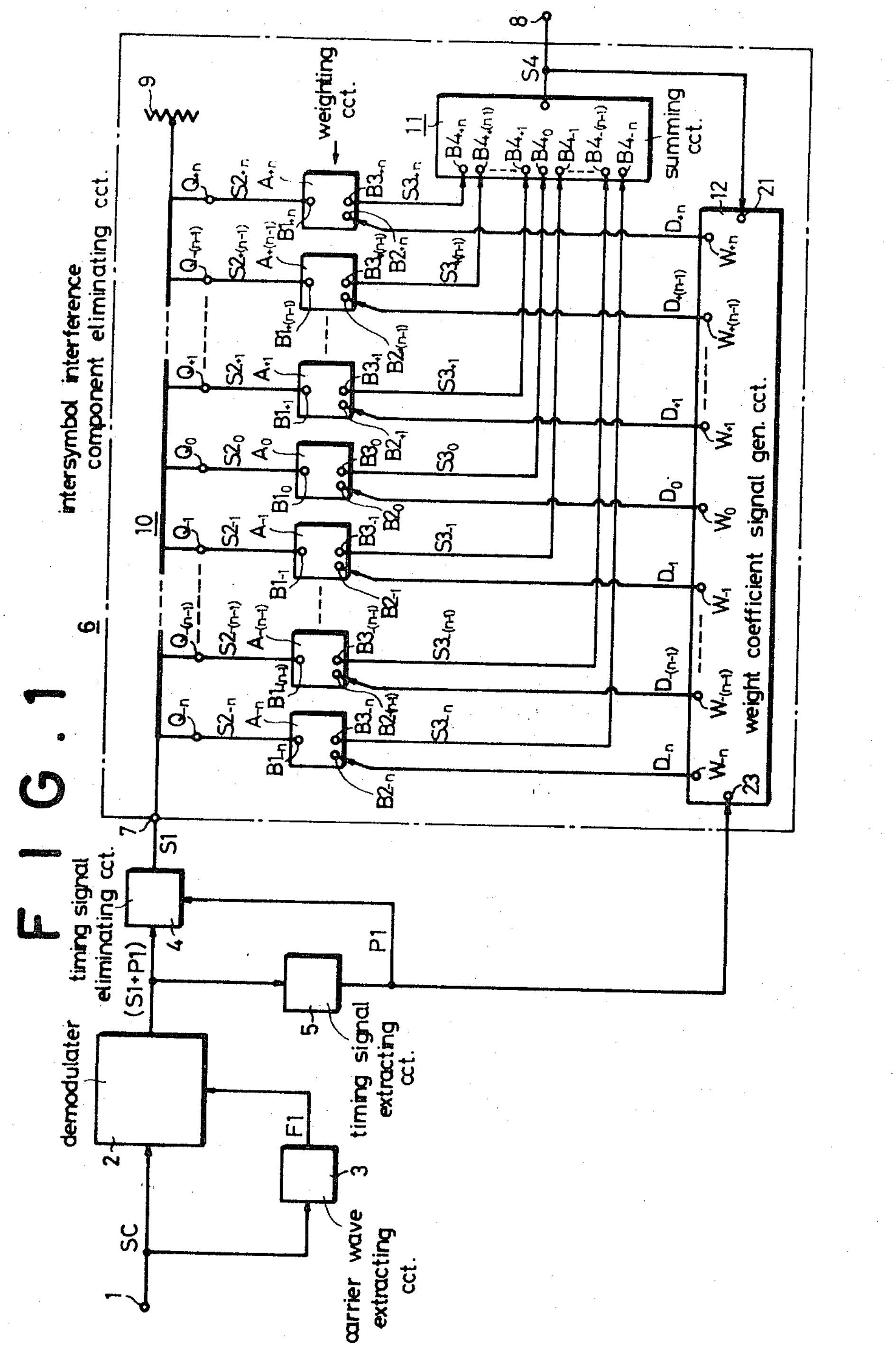
FIG. 1 is a circuit diagram showing a conventional intersymbol interference component eliminating system.
Figure 2:
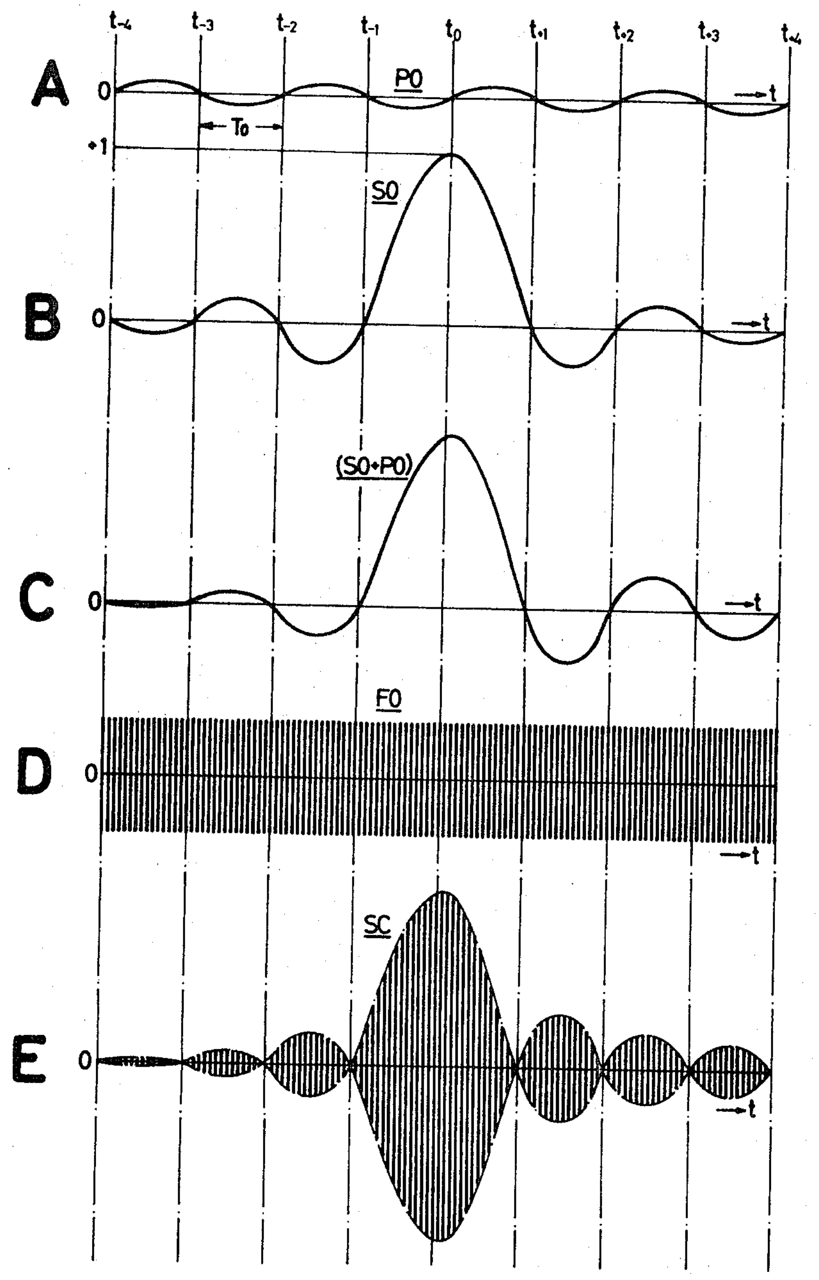
FIG. 2 is a series of waveform diagrams, for explaining the system depicted in FIG. 1.
Figure 2:
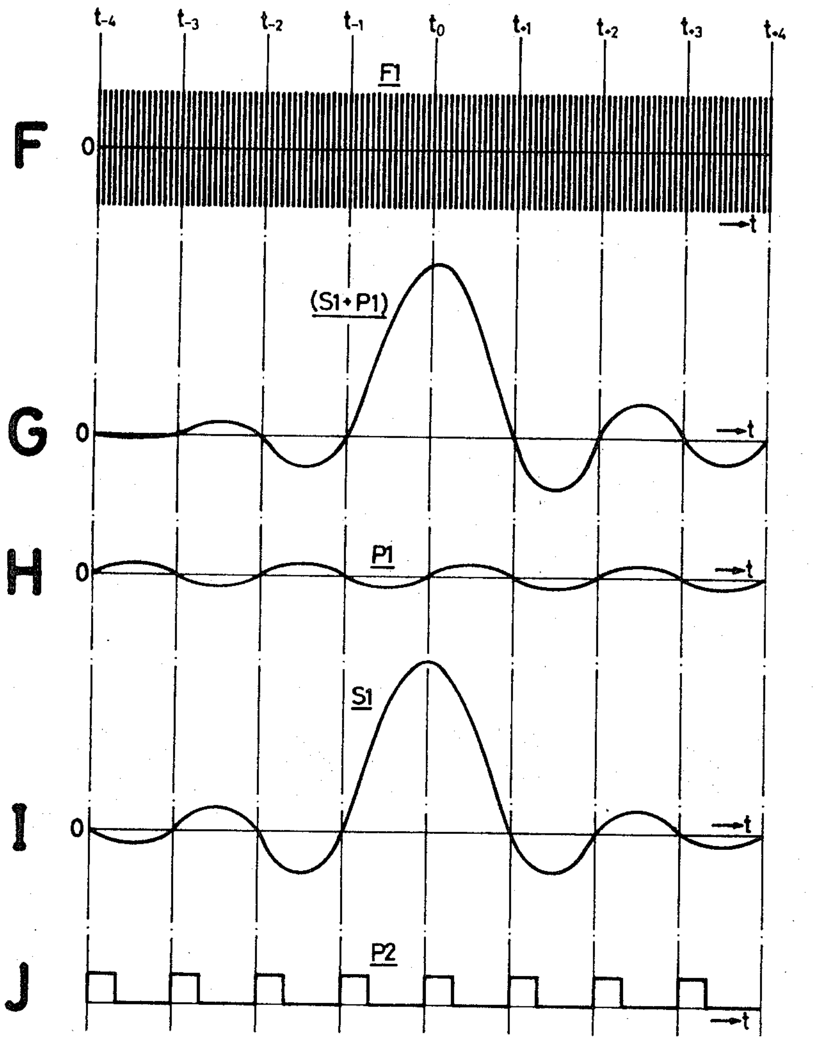

In FIG. 1, reference numeral 1 indicates an input terminal, from which an amplitude modulated signal SC is derived through a transmission line (not shown). The amplitude modulated signal SC is produced by the amplitude modulation of a carrier wave F0 with a composite signal (S0 + P0) composed of a sequence of multi-level digital symbols S0 and a sequence of timing signals thereof P0. The sequence of timing signals P0 has a period $2T_0$ of, for example, 500$\mu$sec. and is shown in FIG. 2A in an ideal form without phase shift. In FIG. 2, reference character $t$ identifies time, $t_0$ and instant $t = t_0$, $t_{-1}$ and $t_{-2}$ . . . instants. $T_0$, $2T_0$, . . . to the instant $t_0$ respectively and $t_{+1}$, $t_{+2}$, . . . instants $T_0$, $2T_0$, . . . past the instant $t_0$ respectively. The sequence of multi-level digital symbols S0 is shown in FIG. 2B in an ideal form without intersymbol interference components. For convenience of illustration, the sequence of multi-level digital symbols S0 is shown as a single digital symbol obtained at the instant $t_0$. The sequence of multi-level digital symbols S0 may have one of four positive values +1, +2, +3 and +4 F0 whose absolute values sequentially increase and four negative values −1, −2, −3 and −4 whose absolute values sequentially increase. In FIG. 2B, however, the sequence of multi-level digital symbols S0 is shown to be of the level +1 for the sake of brevity. The composite digital signal (S0 + P0) is shown in FIG. 2C. The carrier wave FO has a carrier frequency of, for example, 10MHz and is depicted in FIG. 2D. The amplitude modulated signal SC produced by the amplitude modulation of the carrier wave I0 with the composite digital signal (S0 + P0) is shown in FIG. 2E on the assumption that the signal SC has, for example, double side band components.

In view of the fact that the transmission line connected to the input terminal 1 is band restricted, the amplitude modulated signal SC depicted in FIG. 2E is obtained by amplitude modulating the carrier wave F0 with the composite signal (S0 + P0) composed of the sequence of timing signal P0 and the sequence of digital symbols S0 such as illustrated in FIGS. 2B and 2A which have band restricted and non-pulsive waveforms.

The amplitude modulated signal SC is supplied to an amplitude demodulator 2 and, at the same time, to a carrier wave extracting circuit 3. The carrier wave extracting circuit 3 is formed with a tank circuit which is resonant with the frequency of the carrier wave F0. The extracted carrier wave F1 derived from the carrier wave extracting circuit 3 is depicted in FIG. 2F. If the circuit 3 has an ideal characteristic, the carrier wave F1 is obtained in the same phase as the carrier wave F0 shown in FIG. 2D. The extracted carrier wave F1 is supplied to the amplitude demodulator 2 to derive therefrom a composite demodulated digital signal (S1 + P1) such as illustrated in FIG. 2G. If the demodulator 2 is ideal, the composite demodulated digital signal (S1 + P1) thus obtained can be obtained in the same phase and waveform as those of the composite digital signal (S0 + P0). The composite demodulated digital signal (S1 + P1) is supplied to a timing signal eliminating circuit 4 and a timing signal extracting circuit 5. The timing signal extracting circuit 5 is constructed to include a tank circuit which is resonant with a frequency represented by a reciprocal of the period $2T_0$ of the sequence of timing signal P0. A sequence of extracted timing signals P1 derived from the timing signal extracting circuit 5 is illustrated in FIG. 2H, which is obtained in the same phase and waveform as those of the sequence of timing signals P0 shown in FIG. 2A, if the circuit 5 is ideal. The sequence of extracted timing signal P1 is supplied to the timing signal eliminating circuit 4 to derive therefrom a sequence of demodulated digital symbols S1 such as shown in FIG. 2I. If the circuit 4 is ideal, the sequence of demodulated digital symbols S1 is obtained with the same phase and waveform as those of the sequence of digital symbols S0.

The sequence of demodulated digital symbols S1 derived from the timing signal eliminating circuit 4 is supplied to an input terminal 7 of an intersymbol interference component eliminating circuit 6 to eliminate intersymbol interference components from the sequence of digital symbols S1, providing a sequence of digital symbols S4 at an output terminal 8.

The intersymbol interference component eliminating circuit 6 has a delay line 10 extending between the input terminal 7 and a dummy load 9. The delay line 10 has output terminals $Q_{-n}$, $Q_{-(n-1)}$, . . . $Q_{-1}$, $Q_0$, $Q_{+1}$, . . . $Q_{+(n-1)}$, $Q_{+n}$. The lengths of the delay line 10 between the output terminals $Q_{-n}$ and $Q_{-(n-1)}$, between $Q_{-(n-1)}$ and $Q_{-(n-2)}$. . . between $Q_{-1}$ and $Q_0$, between $Q_0$ and $Q_{+1}$, . . . between $Q_{+(n-2)}$ and $Q_{+(n-1)}$ and between $Q_{+(n-1)}$ and $Q_{+n}$ are selected to delay the sequence of digital symbols S1 by $T_0$ which is one-half of the period $2T_0$ of the sequence of timing signals P1. Consequently, a sequence of delayed digital symbols $S2_0$, which is delayed by a time $n \cdot T_0$ relative to the sequence of demodulated digital symbols S1, is derived at the output terminal $Q_0$ of the delay line 10. Further, sequences of delayed digital symbols $S2_{-1}$, $S2_{-2}$, . . . , which are advanced by $T_0$, $2T_0$, . . . relative to the sequence of delayed digital symbols $S2_0$ respectively, are derived at the output terminals $Q_{-1}$, $Q_{-2}$, . . . respectively and sequences of delayed digital symbols $S2_{+1}$, $S2_{+2}$, . . . which are delayed by $T_0$, $2T_0$, . . . relative to the sequence of delayed digital symbols $S2_0$ respectively, are derived at the output terminals $Q_{+1}$, $Q_{+2}$, . . . respectively.

Figure 3:
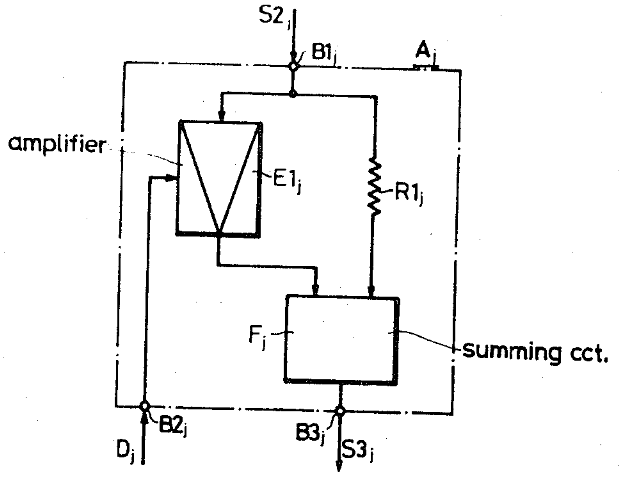
FIG. 3 is a circuit diagram illustrating one example of a weighting circuit used in the system of FIG. 1.

Further, the intersymbol interference component eliminating circuit 6 has weighting circuits $A_j$ ($j = -n, -(n-1), \ldots -1, 0, +1, \ldots +(n-1)$ and $+n$) which are supplied with sequences of delayed digital symbols $S2_j$ from the output terminals $Q_j$ of the delay line 10. Each weighting circuit $A_j$ is of such a construction as shown in FIG. 3 in which one part of the sequence of delayed digital symbols $S2_j$ supplied to its input terminal $B1_j$ is supplied through a resistor $R1_j$ to a summing circuit $F_j$ and the other part is supplied through an amplifier $E1_j$ to the summing circuit $F_j$. In this case, the amplifier $E1_j$ has a control signal input terminal $B2_j$, which is supplied with a weight coefficient control signal $D_j$ from a weight coefficient control signal generating circuit 12 described later to control its gain. Consequently, a sequence of amplitude controlled delayed digital symbols $S3_j$, which is produced by controlling the amplitude of the sequence of delayed digital symbols $S2_j$ from the output terminal $Q_j$ of the delay line 10 in accordance with the level of the weight coefficient control signal $D_j$, is derived at an output terminal $B3_j$ led out from the summing circuit $F_j$ of the weighting circuit $A_j$.

Figure 4:
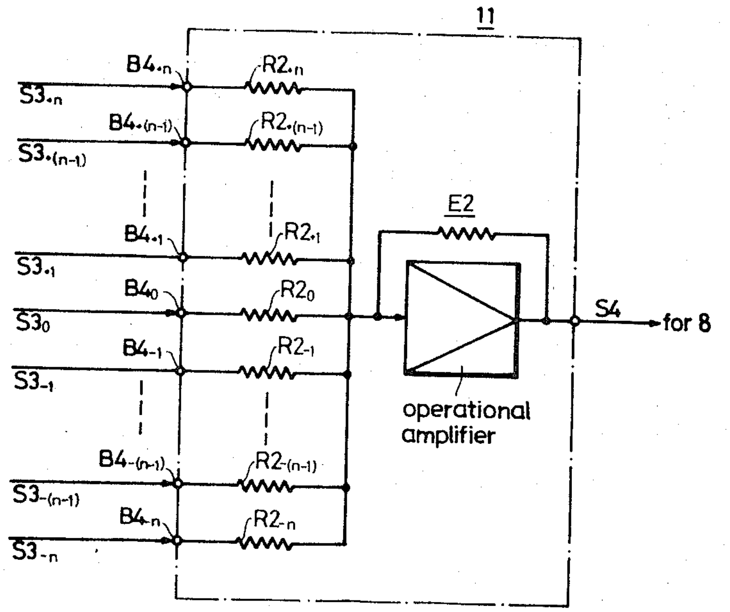
FIG. 4 is a circuit diagram showing one example of a summing circuit used in the system of FIG. 1.

Further, the intersymbol interference component eliminating circuit 6 has a summing circuit 11 which is supplied with the sequence of amplitude controlled digital symbols $S3_j$ derived from the output terminal $B3_j$ of weighting circuit $A_j$. The summing circuit 11 has such a construction as depicted in FIG. 4 in which the sequences of amplitude controlled digital symbols $S3_j$ supplied to its input terminals $B4_j$ are applied to the input of a common operational amplifier E2 through resistors $R2_j$ and the output of the amplifier E2 is connected to an output terminal 8. Accordingly, the summing circuit 11 derives therefrom a summed output of the sequences of amplitude controlled digital symbols $S2_{-n}$, $S2_{-(n-1)}$, . . . $S2_{-1}$, $S2_0$, $S2_{+1}$, . . . $S2_{+(n-1)}$ and $S2_{+n}$ as the sequence of demodulated digital symbols S4.

Figure 5:
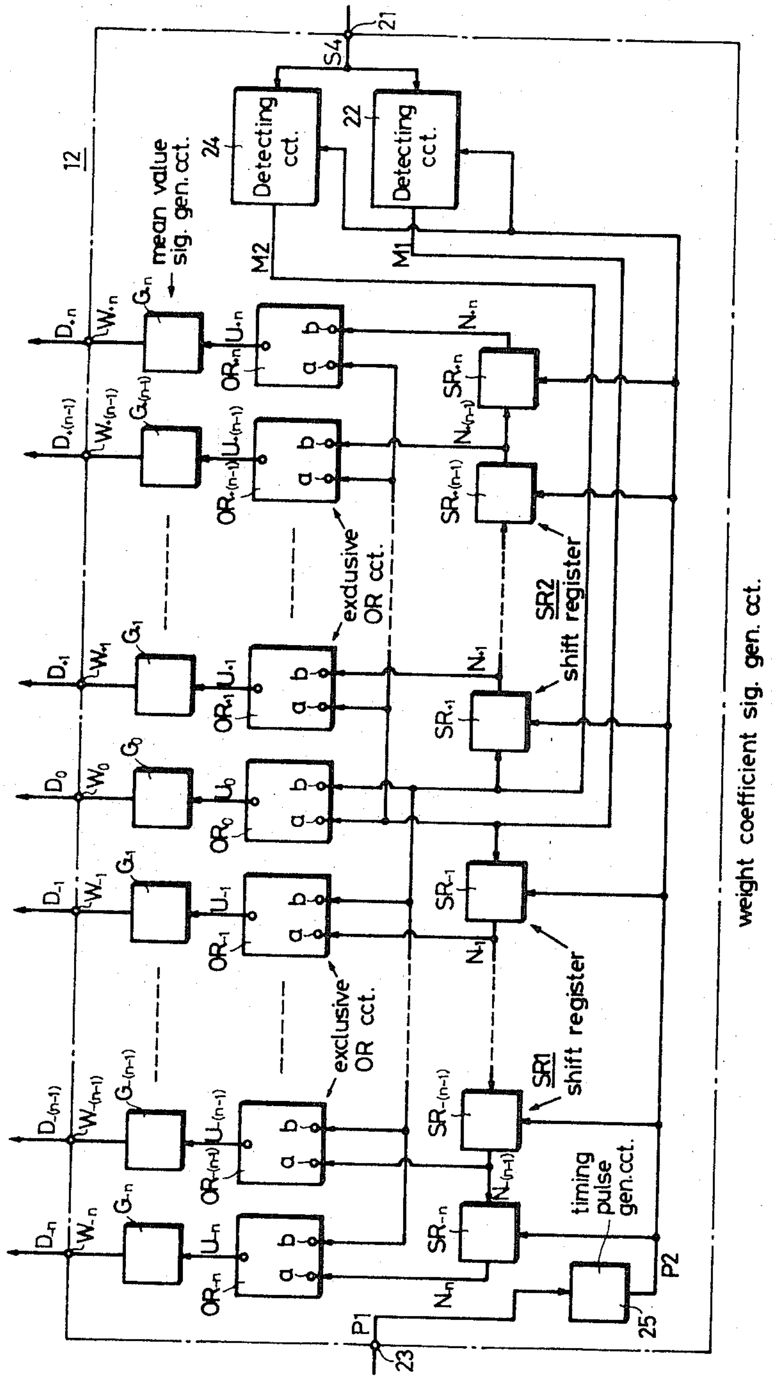
FIG. 5 is a circuit diagram showing one example of a weight coefficient control signal generating circuit employed in the system of FIG. 1.

Still further, the intersymbol interference component eliminating circuit 6 has a weight coefficient control signal generating circuit 12, which may be of such a circuit construction as illustrated in FIG. 5.

Namely, the weight coefficient control signal generating circuit 12 includes a multi-level detecting circuit 22 which is supplied with the sequence of demodulated digital symbols S4 through an input terminal 21. The multi-level detecting circuit 22 has the aforementioned eight setting voltage levels represented by +1, +2, +3, +4, −1, −2, −3 and −4 and is adapted so that its timing is controlled by a sequence of timing pulses P2 such as shown in FIG. 2J which is derived from a timing pulse generating circuit 25. The sequence of timing pulses P2 is obtained with a period $T_0$ by supplying the sequence of timing signals P1 from the timing signal extracting circuit 5 to the timing pulse generating circuit 25 through an input terminal 23. The multi-level detecting circuit 22 detects the closest one of the aforesaid eight setting voltage levels to the level of the sequence of demodulated digital symbols S4, for example, at the time corresponding to the leading edge of each of the timing pulses P2 and whether the level of the demodulated digital symbols S4 is positive or negative relative to the said one of the eight setting voltage levels, and the multi-level detecting circuit 22 produces an output M1 which is represented by "1" or "0" in binary indication according as the former level is positive or negative relative to the letter level. Further, the weight coefficient control signal generating circuit 12 includes a polarity detecting circuit 24 which is supplied with the sequence of demodulated digital symbols S4. The polarity detecting circuit 24 is also controlled by the sequence of timing pulses P2 to detect the polarity of the sequence of demodulated digital symbols S4 at the leading edge of each of the timing pulses P2, providing an output M2 which is represented by 1 or 0 in binary indication according as the polarity of the sequence of demodulated digital symbols S4 is positive or negative. The output M1 is supplied to a series of 1-bit shift registers $SR_{-1}$, $SR_{-2}$, . . . $SR_{-n}$ making up one shift register SR1, while the output M2 is supplied to a series of 1-bit shift registers $SR_{+1}$, $SR_{+2}$, . . . $SR_{+n}$ making up the other shift register SR2. These shift registers SR1 and SR2 are adapted to shift by one bit for each of the timing pulses P2. Further, the output M1 is applied to the one input $a$ of each of exclusive OR circuits $OR_0$, $OR_{+1}$, $OR_{+2}$, . . . $OR_{+n}$ having two inputs $a$ and $b$ respectively, while the output M2 is applied to the one input $b$ of each of exclusive OR circuits $OR_0$, $OR_{-1}$, $OR_{-2}$, . . . $OR_{-n}$ similarly having two inputs $a$ and $b$ respectively. The other inputs $b$ of the exclusive OR circuits $OR_{+1}$, $OR_{+2}$, . . . $OR_{+n}$ are supplied with outputs $N_{+1}$, $N_{+2}$, . . . $N_{+n}$ of the shift registers $SR_{+l}$, $SR_{+2}$, . . . $SR_{+n}$ respectively and the other inputs $a$ of the exclusive OR circuits $OR_{-1}$, $OR_{-2}$, . . . $OR_{-n}$ are supplied with outputs $N_{-1}$, $N_{-2}$, . . . $N_{-n}$ of the shift registers $SR_{-1}$, $SR_{-2}$, . . . $SR_{-n}$ respectively. The output $U_j$ of the exclusive OR circuit $OR_j$ is supplied to a mean value signal generating circuit $G_j$ to derive the aforementioned weight coefficient control signal $D_j$ at its output terminal $W_j$.

Figure 6:
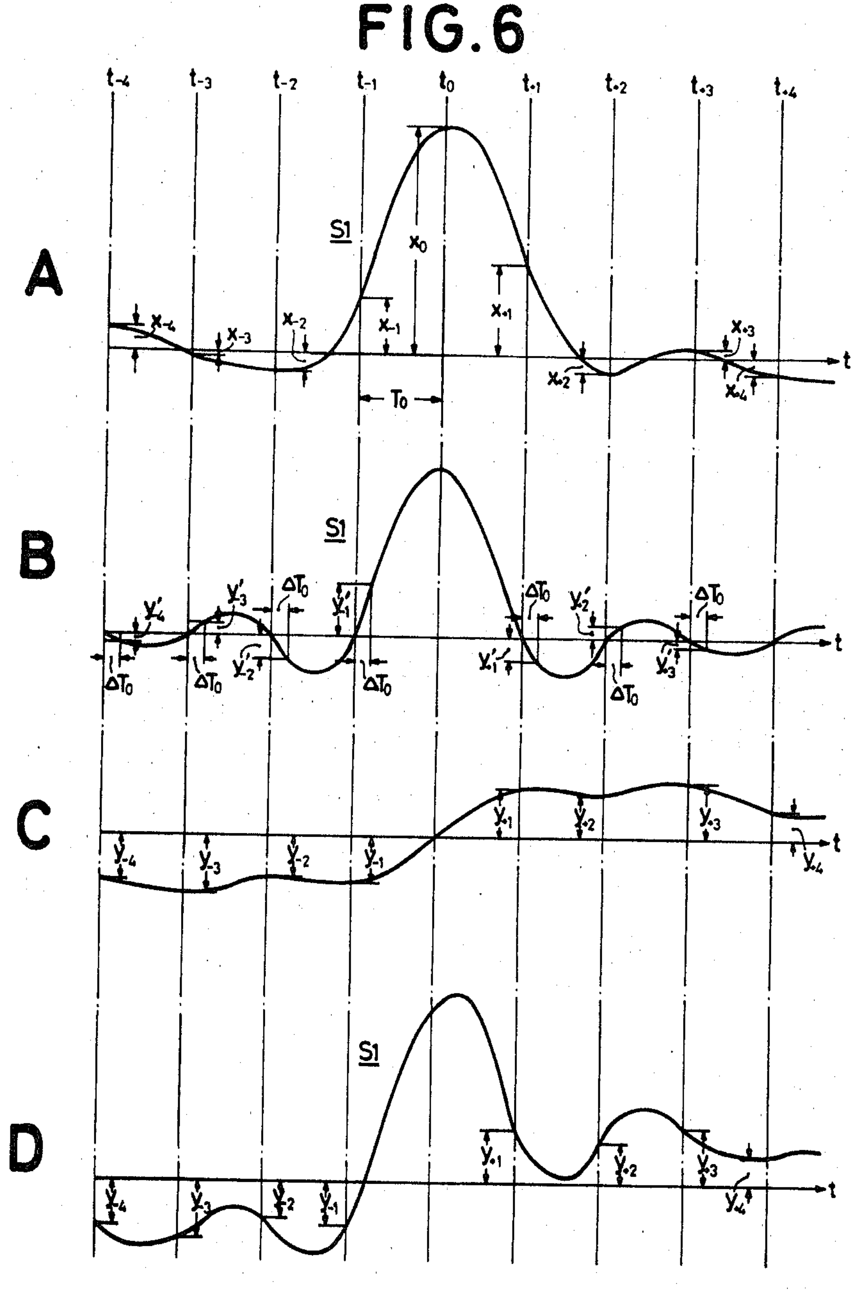
FIG. 6 is a series of waveform diagrams, for explaining this invention.

The foregoing has described the conventional intersymbol interference component eliminating system. The amount of intersymbol interference components to be eliminated by the intersymbol interference component eliminating circuit 6 is represented by the amplitude value of the output derived at each of the terminals $Q_{-n}$, $Q_{-(n-1)}$, . . . $Q_{-1}$, $Q_{+1}$, . . . $Q_{+(n-1)}$ and $Q_{+n}$ of the delay line 10 when the sequence of demodulated digital symbols S1 supplied to the input terminal 7 of the circuit 6 is a single symbol and it has just arrived at the output terminal $Q_0$ of the delay line 10. The sequence of demodulated digital symbols S1 shown in FIG. 2I is that which is obtained where the intersymbol interference component is zero. However, where intersymbol interference components are present in the sequence of demodulated digital symbols S1, the sequence of demodulated digital symbols S1 is generally obtained in such a form as depicted in FIG. 6A.

If the amplitude value of the sequence of demodulated digital symbols S1 at an instant $t_k$ ($k = -n$, $-(n-1)$, . . . $-1, +1$, . . . $+(n-1)$ and $+n$) expressed by $$t_k = t_0 + kT_0 \tag{1}$$

is taken as $x_k$, this is the amount of the intersymbol interference components at the instant $t_k$. Accordingly, the weight coefficient control signal generating circuit 12 in the intersymbol interference component eliminating circuit 6 is constructed so that a weight coefficient control signal $D_k$ derived at its output terminal $W_j$ may correspond to $-x_0 \cdot C_k$ which is the value of multiplication of the amplitude value $x_0$ of the sequence of digital symbols S1 at the instant $t_0$ by a coefficient $C_k$. The weight coefficient control signal $D_k$ is supplied to the weighting circuit $A_k$, in which the sequence of digital symbols $S2_k$ is amplitude controlled by the control signal $D_k$ to provide $x_k = 0$. Consequently, the weighting circuit $A_k$ has a weight coefficient $C_k$ represented by $$C_k = -(x_k/x_0) \tag{2}$$

Therefore, the amount of the intersymbol interference components contained in the sequence of demodulated digital symbols S1 can be known based on the weight coefficient $C_k$ of the weighting circuit $A_k$.

The sequence of demodulated digital symbols S1 contains therein intersymbol interference components in the case where the phase of the carrier wave F1 derived from the aforesaid carrier wave extracting circuit 3 shifts from a predetermined phase. Accordingly, the aforementioned amount of intersymbol interference components $x_k$ includes components based on the phase shift of the carrier wave F1. Where the amplitude modulated signal SC is produced by the amplitude modulation of the carrier wave with the band-restricted composite signal (SO + PO) as described previously, these components are produced as a great value with a small amount of phase shift of the carrier wave F1. Such intersymbol interference components should be eliminated by the above-described intersymbol interference component eliminating circuit 6 but if the amount of intersymbol interference components $x_k$ is relatively large, all the components cannot completely be eliminated or removed by the circuit 6 because of a limitation on the margin of operation of the circuit 6. Accordingly, if the amount of intersymbol interference components $x_k$ is relatively large, there is the possibility of the intersymbol interference components remaining in the sequence of demodulated digital symbols S4 derived from the circuit 6. Also in the case where the phase of the sequence of timing signals P1 derived from the timing signal extracting circuit 5 shifts from a predetermined phase, there is the likelihood that intersymbol interference components remain in the sequence of demodulated digital symbols S4.

Assuming that no intersymbol interference component is present in the sequence of demodulated digital symbols S1, it has such a waveform as shown in FIG. 6B similar to that depicted in FIG. 2I which provides $x_k = 0$. However, if intersymbol interference components are contained in the sequence of demodulated digital symbols S1 only by a phase shift of the carrier wave F1, the intersymbol interference components are odd-symmetrical with respect to the time $t_0$ as shown in FIG. 6C. Accordingly, in this case, the sequence of demodulated digital symbols S1 has a waveform such as shown in FIG. 6D. In this case, if the amount of intersymbol interference components at the time $t_k$ is taken as $y_k$, the following relation exists:

$$\sum_{k=-n}^{-1} y_k = -\sum_{k=1}^{+n} y_k \qquad (3)$$

However, the intersymbol interference components are produced by other causes than the phase shift of the carrier wave F1, for example, a change in the transmission characteristic of the transmission system or line for the amplitude modulated signal SC supplied to the input terminal 1, a phase shift of the sequence of timing signals P1 supplied to the timing pulse eliminating circuit 4 and so on. Such intersymbol interference components are contained in the sequence of demodulated digital symbols S1 and the weight coefficient of the weighting circuit $A_k$ is provided as $C_k$ represented by the equation (2).

If, now, $$\alpha_k = -(y_k/X_0) \qquad (4)$$

if the intersymbol interference component other than those due to the phase shifts of the carrier wave F1 and the sequence of timing signals P1 is taken as $z_k$ and if $$\beta_k = -(z_k/x_0) \qquad (5)$$

it follows that $$C_k = \alpha_k + \beta_k \qquad (6)$$

By the way, $\alpha_k/\beta_k$ increases on an average with an increase in $k$ and in a range that $k$ is relatively small $\alpha_k >> \beta_k$. While, when no phase shift occurs in the sequence of timing signals P1, the absolute value of $\alpha_k$ decreases on an average with an increase in $k$ and absolute value of $\alpha_k$ in the range of $k$ being great is fully smaller than that in the range of $k$ being small. Accordingly, when no phase shift occurs in the sequence of timing signals P1, if $$\Delta I_C = \sum_{\substack{k=-n \\ \neq 0}}^{+n} \frac{C_k}{\alpha_{k_C}} \qquad (7)$$

the correlation value $\Delta I_C$ represents a value closer to that corresponding to the intersymbol interference components based on only the carrier wave F1 and $\alpha_{k_C}$ represents a given value corresponding to $\alpha_k$ in the case where the phase of the carrier wave F1 shifts by a predetermined amount. Therefore, it is considered that where no phase shift occurs in the sequence of timing signals P1, the intersymbol interference components, represented by $\alpha_k$, based on only the phase shift of the carrier wave F1 can be eliminated by obtaining the correlation value $\Delta I_C$ and controlling the phase of the carrier wave F1 based on a phase control signal having a level corresponding to the value $\Delta I_C$. However, in the same cases $\alpha_{k_C}$ becomes zero and $1/\alpha_{k_C}$ becomes infinite and, in such a case, $1/\alpha_{k_C}$ is so limited as to have finite value for example 10.

Assuming that intersymbol interference components are contained in the sequence of demodulated digital symbols S1 only by the occurrence of an amount of phase shift represented by $\Delta T_0$ in the sequence of timing signals P1, the intersymbol interference components are represented by $y'_k$ in the sequence of demodulated digital symbols S1 depicted in FIG. 6B.

Accordingly, if $$\alpha'_k = -(y'_k/x_0) \qquad (8)$$

it is considered that where no phase shift occurs in the carrier wave F1, the intersymbol interference components, represented by $\alpha'_k$, produced only by the phase shift of the sequency of timing signals P1 can be eliminated by obtaining a correlation value $\Delta I_T$ expressed by $$\Delta I_T = \sum_{\substack{k=-n \\ \neq 0}}^{+n} \frac{C_k}{\alpha'_{k_C}} \qquad (9)$$

and controlling the phase of the sequence of timing signals P1 based on a phase control signal of a level corresponding to the value $\Delta I_T$ for the same reason as that in the case of the phase shift of the carrier wave F1. However, in same cases $\alpha'_{k_C}$ becomes infinite and, in such a case, $1/\alpha'_{k_C}$ is so limited as to have finite value for example 10.

The foregoing description has been given in connection with the case where, when no phase shift occurs in the sequence of timing signals P1, the intersymbol interference component caused only by the phase shift of the carrier wave F1 is eliminated by the phase control signal corresponding to the value $\Delta I_C$ given by the equation (7). However, in the event that the phases of both of the carrier wave F1 and the sequence of timing signals P1 shift, the above equation (6) is given in the following form:

$$C_k = \alpha_k + \alpha'_k + \beta_k \qquad (10)$$

accordingly, in this case, if $C_k$ given by the equation (10) is used, the equation (7) is rewritten as follows:

$$\Delta I_C = \sum_{\substack{k=-n \\ \neq 0}}^{+n} \frac{\alpha_k}{\alpha_{k_C}} + \sum_{\substack{k=-n \\ \neq 0}}^{+n} \frac{\alpha'_k}{\alpha_{k_C}} + \sum_{\substack{k=-n \\ \neq 0}}^{+n} \frac{\beta_k}{\alpha_{k_C}} \qquad (11)$$

However, the correlation of $\beta_k/\alpha_{k_C}$ of the third term of the equation (11) is irrelevent to the phase shift of the carrier wave F1 and the degree of correlation of $\alpha'_k/\alpha_{k_C}$ of the second term is fully low, so that the value of $$\sum_{\substack{k=-n \\ \neq 0}}^{+n} \frac{\alpha_k}{\alpha_{k_C}}$$

of the first term of the equation (11) is far greater than the value of the sum of the second and third terms $$\left(\sum_{\substack{k=-n\\ \neq 0}}^{+n}\frac{\alpha'_k}{\alpha_{k_C}}+\sum_{\substack{k=-n\\ \neq 0}}^{+n}\frac{\beta_k}{\alpha_{k_C}}\right).$$

Consequently, if phase shift occurs in the carrier wave F1 or in both of the carrier wave F1 and the sequence of timing signals P1, the intersymbol interference component based on the phase shift of the carrier wave F1 can be sufficiently eliminated by controlling the phase of the carrier wave F1 with the phase control signal corresponding to the value of $\Delta I_C$ given by the above equation (7)

Also, in the case where phase shift occurs in both of the carrier wave F1 and the sequence of timing signals P1, the above equation (9) is given in the following form:

$$\Delta I_T=\sum_{\substack{k=-n\\ \neq 0}}^{+n}\frac{\alpha'_k}{\alpha'_{k_C}}+\sum_{\substack{k=-n\\ \neq 0}}^{+n}\frac{\alpha_k}{\alpha'_{k_C}}+\sum_{\substack{k=-n\\ \neq 0}}^{+n}\frac{\beta_k}{\alpha'_{k_C}} \qquad (12)$$

as in the case of obtaining the equation (10). However, the correlation of the third term of the equation (12) is independent of the phase shift of the sequence of timing signal P1 and the degree of correlation of the second term is fully low, so that the value of the first term is much greater than the sum of the second and third terms. Consequently, even if phase shift occurs in the sequence of timing signals P1 or in both of the sequence of timing signals P1 and the carrier wave F1, the intersymbol interference component based on the phase shift of the sequence of timing signals P1 can be sufficiently eliminated by controlling the phase of the sequence of timing signals P1 with the phase control signal corresponding to the value of $\Delta I_T$ given by the equation (9).

Figure 7:
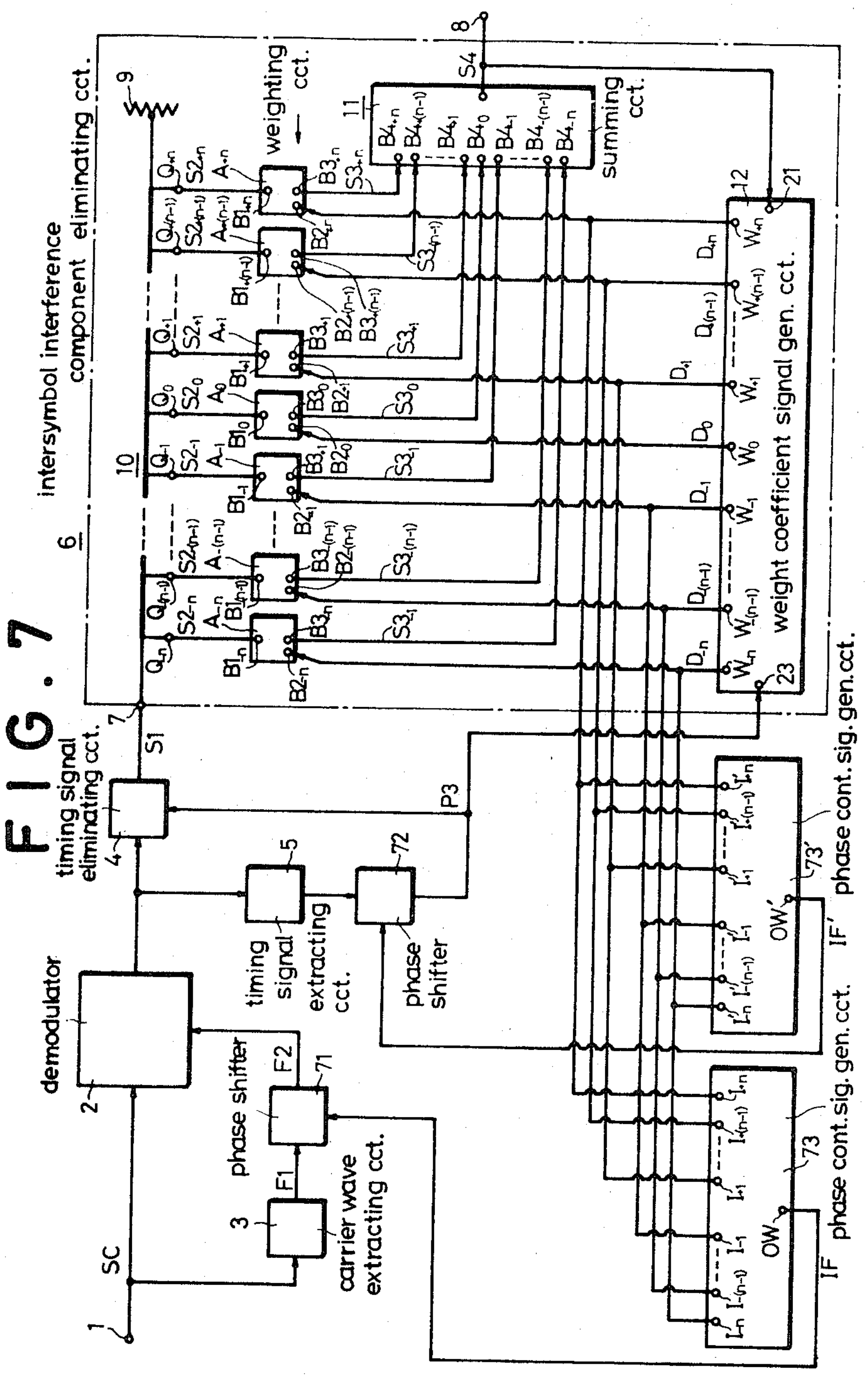
FIG. 7 is a circuit diagram illustrating one example of this invention.

FIG. 7 illustrates one example of an improved intersymbol interference component eliminating system of this invention constructed based on the foregoing discussion. In FIG. 7, parts corresponding to those in FIG. 1 are identified by the same reference numerals and characters and no detailed description will be repeated. In the present example, a phase shifters 71 and 72 are interposed between the carrier wave extracting circuit 3 and the demodulator 2 and between the timing signal extracting circuit 5 and the weight coefficient control signal generating circuit 12 of the intersymbol interference component eliminating circuit 6 respectively and the output of the phase shifter 72 is connected to the timing signal eliminating circuit 4.

Figure 8:
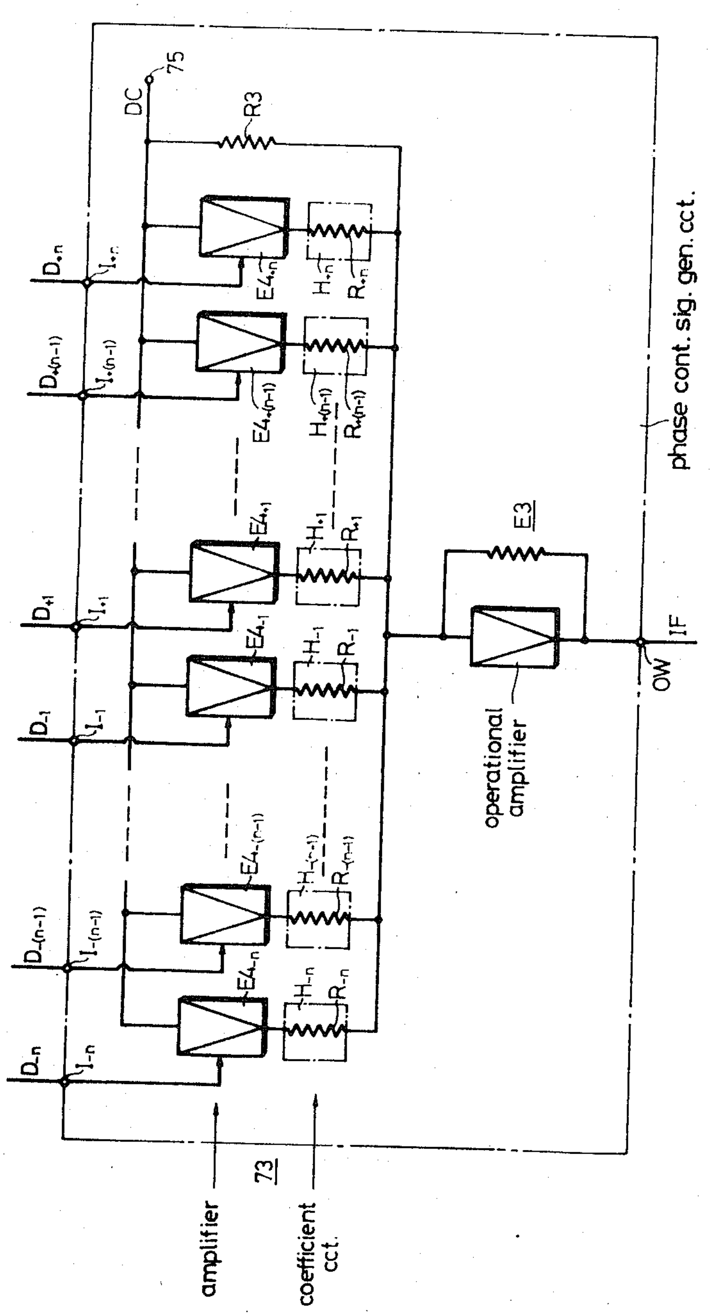
FIG. 8 is a circuit diagram showing one example of a phase control signal generating circuit employed in the example of this invention depicted in Figure.

Further, the weight coefficient control signal $D_j$ derived from the output terminal $W_j$ of the weight coefficient control signal generating circuit 12 is supplied to terminals $I_j$ and $I'_j$ of phase control signal generating circuits 73 and 73'. The circuit 73 is adapted so that a DC signal from a DC power source 75 is supplied to an operational amplifier E3 through a resistor R3 and, at the same time, through an amplifier $E4_j$ and a coefficient circuit $H_j$ made up of a series resistor $R4_j$ and that the amplifier $E4_j$ is controlled by the weight coefficient control signal $D_j$ derived through an input terminal $I_j$ as shown in FIG. 8. In this case, the value of the resistor $R4_j$ of the coefficient circuit $H_j$ is selected in accordance with the aforesaid $\alpha_{k_C}$ $\alpha_{k_C}$ in this case is preselected to be of a value which is determined by the intersymbol interference components produced when a predetermined amount of phase shift occurs in the carrier wave F1. Accordingly, a phase control signal IF corresponding to the correlation value $\Delta I_C$ expressed by the equation (7) is derived at an output terminal OW led out from the operational amplifier E3 of the phase control signal generating circuit 73. The circuit 73' in similar construction to the circuit 73, though not shown. In this case, however, the value of the resistor of the coefficient circuit is selected in accordance with $\alpha'_{k_C}$ described above and the circuit 73' is designed to derive at its output terminal OW' a phase control signal IF' corresponding to the correlation value $\Delta I_T$ expressed by the equation (9).

The phase control signals IF and IF' thus obtained from the phase control signal generating circuits 73 and 73' are supplied to the above-mentioned phase shifters 71 and 72 respectively, in which the phases of the carrier wave F1 and the sequence of timing signals P1 are shifted corresponding to the levels of the phase control signals IF and IF' respectively to provide a phase shifted carrier wave F2 and a sequence of phase shifted timing signals P2. The carrier wave F2 and the sequence of timing signals P3 thus obtained are supplied to the demodulator 2 and the timing signal eliminating circuit 4 and the weight coefficient control signal generating circuit 12 of the intersymbol interference component eliminating circuit 6 respectively.

With such an arrangement as described above, the carrier wave F1 in FIG. 1 supplied to the demodulator 2 is replaced with the carrier wave F2 having its phase shifted according to the phase control signal IF, the sequence of timing signals P1 in FIG. 1 supplied to the timing signal eliminating circuit 4 and the weight coefficient control signal generating circuit 12 of the intersymbol interference component eliminating circuit 6 is replaced with the sequence of timing signals P3 phase shifted according to the phase control signal IF' and the phase control signals IF and IF' have levels corresponding to the correlation values $\Delta I_C$ and $\Delta I_T$ expressed by the equations (7) and (9) respectively. Accordingly, even if phase shifts occur at least in the carrier wave F1 derived from the carrier wave extracting circuit 3 and the sequence of timing signals P1 derived from the timing signal extracting circuit 5 respectively, the sequence of demodulated digital symbols S1 from the timing signal eliminating circuit 4 is obtained without containing therein any intersymbol interference components based on the phase shifts of the carrier wave F1 and the sequence of timing signals P1. Consequently, the sequence of digital symbols S4 is also obtained without containing therein any intersymbol interference components based on the aforementioned phase shifts.

In the foregoing, the amplitude modulated signal SC produced by the amplitude modulation of the carrier wave F0 with the composite signal (S0 + P0) is demodulated, the sequence of timing signals P1 is extracted from the demodulated composite signal (S1 + P1) and the intersymbol interference components are eliminated from the sequence of digital symbols S1. However, this invention is also applicable to the case where the amplitude modulated signal SC is a modulated signal produced by the amplitude modulation of the carrier wave F0 only with the sequence of digital symbols S0 synchronized with the sequence of timing signals P0 sequence of timing signals P0 is transmitted through a channel different from that for the signal SC. In this case, the above-described timing signal extracting circuit 5 and the timing signal eliminating circuit 4 are omitted and the sequence of timing signals PO is supplied through the phase shifter 72 to the weight coefficient control signal generating circuit 12 of the intersymbol interference component eliminating circuit 6.

The foregoing description has been given in connection with the case where the phases of the carrier wave and the sequence of timing signals are controlled by the phase control signals IF and IF' corresponding to the correlation values $\Delta I_C$ and $\Delta I_T$ expressed by the equations (7) and (9) respectively. However, it is also possible to control the phases of the carrier wave and the sequence of timing signals with phase control signals corresponding to the following correlation values $\Delta I_C$ and $\Delta I_T$:

$$\Delta I_C = \sum_{\substack{k=-m \\ \neq 0}}^{+m} \frac{Ck}{\alpha_{k_C}} \qquad (7)'$$

$$\Delta I_T = \sum_{\substack{k=-m' \\ \neq 0}}^{+m'} \frac{Ck}{\alpha'_{k_C}} \qquad (9)'$$

which are obtained by substituting $n$'s in the equations (7) and (9) with $m$ and $m'$ ($m$ and $m'$ being smaller than $n$ but greater than 5 or 6 respectively) respectively. Further it is also possible to control the phases of the carrier wave and the sequence of timing signals with phase control signals corresponding to the following correlation values $\Delta I_C$ and $\Delta I_T$:

$$\Delta I_C = \sum_{\substack{k=-m_1 \\ \neq 0}}^{+m_2} \frac{Ck}{\alpha_{k_C}} \qquad (7)''$$

$$\Delta I_T = \sum_{\substack{k=-m_1 \\ \neq 0}}^{+m_2} \frac{Ck}{\alpha'_{k_C}} \qquad (9)''$$

which are obtained by substituting $m$ on the negative side with $m_1$ and $m$ on the positive side with $m_2$ in the equation (7)' ($m_1=m_2$ or $m_1 \neq m_2$) and $m$ on the negative side with $m_1'$ and $m$ on the positive side with $m_2'$ in the equation (9)' ($m_1'=m_2'$ or $m_1' \neq m_2'$) respectively. Moreover, in the foregoing description the values of the $n$'s are equal to each other on the positive and negative sides and accordingly $j=-n, -(n+1), \ldots -1, 0, +1, \ldots +(n-1)$ and $+n$ but it is also possible to replace the $n$'s values on the negative and positive sides with $n_1$ and $n_2$ respectively ($n_1$ $n_2$ or $n_1=n_2=n$) to provide $j=-n_1, -(n_1+1), \ldots -1, 0, +1, \ldots +(n_2-1)$ and $+n_2$.

It will be apparent that many modifications and variations may be effected without departing from the scope of the novel concepts of this invention.

I claim as my invention

1. An intersymbol interference component eliminating system comprising:

*i.* a demodulator for demodulating an amplitude modulated signal by supplying a carrier wave extracted from the amplitude modulated signal to obtain a demodulated digital signal, the amplitude modulated signal being produced by the amplitude modulation of a carrier wave with a digital signal composed of at least a sequence of timing signals,

*ii.* intersymbol interference component eliminating means including a delay line having a plurality of terminals $Q_{-n_1}, Q_{-(n_1-1)}, \ldots Q_{-1}, Q_0, Q_{+1}, \ldots Q_{+(n_2-1)}$ and $Q_{+n_2}$ ($n_1$ and $n_2$ being integers) sequentially led out therefrom and supplied with the demodulated digital signal derived from the demodulator, a plurality of weighting circuits $A_{-n_1}, A_{-(n_1-1)}, \ldots A_{-1}, A_0, A_{+1}, \ldots A_{+(n_2-1)}$ and $A_{+n_2}$ supplied with outputs derived from the plurality of terminals $Q_{-n}, Q_{-(n_1-1)}, \ldots Q_{-1}, Q_0, Q_{+1}, \ldots Q_{+(n_2-1)}$ and $Q_{+n_2}$ of the delay line, summing means for summing outputs derived from the plurality of weighting circuits, and weight coefficient control signal generating means for generating a plurality of weight coefficient control signals $D_{-n_1}, D_{-(n\ -1)}, \ldots D_{-1}, D_0, D_{+1}, \ldots D_{+(n_2-1)}$ and $D_{+n_2}$ based on the output of the summing means and the sequence of timing signals, the weighting circuit $A_j$ ($j$ being $-n_1, -(n-1), \ldots -1, 0, +1, \ldots +(n_2-1)$ and $+n_2$) being controlled in its weight coefficient $C_j$ by the weight coefficient control signal $D_j$, which is characterized by

*iii.* carrier wave phase control signal generating means for generating a carrier wave phase control signal based on the weight coefficient control signals $D_{-m_1}, D_{-(m_1-1)}, \ldots D_{-1}, D_{+1}, \ldots D_{+(m_2-1)}$ and $D_{+m_2}$, ($m_1$ and $m_2$ being integers, $m_1 < n_1$ and $m_2 < n_2$) the carrier wave phase control signal corresponding to a correlation value $\Delta I_C$ represented by $$\Delta I_C = \sum_{\substack{k=-m_1 \\ \neq 0}}^{+m_2} \frac{Ck}{\alpha k_C}$$

($k$ being $-m_2, -(m_1-1), \ldots -1, +1, \ldots +(m_2-1)$ and $+m_2$) and $\alpha_{k_C}$ being a predetermined weight coefficient corresponding to the weight coefficient $C_k$ in the case where only the phase of the carrier wave supplied to the demodulator shifts by a predetermined amount, and iv. carrier wave phase shifting means for shifting the phase of the carrier wave supplied to the demodulator based on the carrier wave phase control signal derived from the carrier wave phase control signal generating means.

2. An intersymbol interference component eliminating system comprising:

*i.* a demodulator for demodulating an amplitude modulated signal by supplying a carrier wave extracted from the amplitude modulated signal to obtain a demodulated digital signal, the amplitude modulated signal being produced by the amplitude modulation of a carrier wave with a digital signal composed of at least a sequence of timing signals,

*ii.* intersymbol interference component eliminating means including a delay line having a plurality of terminals $Q_{-n_1}, Q_{-(n_1-1)}, \ldots Q_{-1}, Q_0, Q_{+1}, \ldots Q_{+(n_2-1)}$ and $Q_{+n_2}$ ($n_1$ and $n_2$ being integers) sequentially led out therefrom and supplied with the demodulated digital signal derived from the demodulator, a plurality of weighting circuits $A_{-n_1}, A_{-(n_1-1)}, \ldots A_{-1}, A_0, A_{+1}, \ldots A_{+(n_2-1)}$ and $A_{+n_2}$ supplied with outputs derived from the plurality of terminals $Q_{-n_1}, Q_{-(n_1-1)}, \ldots Q_{-1}, Q_0, Q_{+1}, \ldots Q_{+(n_2-1)}$ and $Q_{+n_2}$ of the delay line, summing means for summing outputs derived from the plurality of weighting circuits, and weight coefficient control signal generating means for generating a plurality of weight coefficient control signals $D_{-n_1}, D_{-(n_1-1)}, \ldots D_{-1}, D_0, D_{+1}, \ldots D_{+(n_2-1)}$ and $D_{+n_2}$ based on the output of the summing means and the sequence of timing signals, the weighting circuit $A_j$ ($j$ being $-n_1, -(n_1-1), \ldots -1, 0, +1, \ldots +(n_2-1)$ and $+n_2$) being controlled in its weight coefficient $C_j$ by the weight coefficient control signal $D_j$, which is characterized by

*iii.* timing signal phase control generating means for generating a timing signal phase control signal based on the weight coefficient control signals $D_{-m_1'}, D_{-(m_1'-1)}, \ldots D_{-1}, D_{+1}, D_{+(m_2'-1)}$ and $D_{+m_2'}$ ($m_1'$ and $m_2'$ being integers, $m_1' < n_1$ and $m_2' < n_2$), the timing signal phase control signal corresponding to a correlation value $\Delta I_T$ represented by $$\Delta I_T = \sum_{\substack{k=-m_1' \\ \neq 0}}^{+m_2'} \frac{Ck}{\alpha' k_C}$$

($k$ being $-m_1', -(m_1'-1), \ldots -1, +1, \ldots +(m_2'-1)$ and $+m_2'$) and $\alpha' k_C$ being a predetermined weight coefficient corresponding to the weight coefficient $C_k$ in the case where only the phase of the sequence of timing signals supplied to the intersymbol interference component eliminating means, and

*iv.* timing signal phase shifting means for shifting the phase of the sequence of timing signals supplied to the intersymbol interference component eliminating means based on the timing signal phase control signal derived from the timing signal phase control signal generating means.

3. An intersymbol interference component eliminating system according to claim 1, further comprising

*v.* timing signal phase control signal generating means for generating a timing signal phase control signal based on the weight coefficient control signals $D_{-m_1'}, D_{-(m_1'-1)}, \ldots D_{-1}, D_{+1}, \ldots D_{+(m_2'-1)}$ and $D_{+m_2'}$ ($m_1'$ and $m_2'$ being integers, $m_1' < n_1$ and $m_2' < n_2$), the timing signal phase control signal corresponding to a correlation value $\Delta I_T$ represented by $$\Delta I_T = \sum_{\substack{k=-m_1' \\ \neq 0}}^{+m_2'} \frac{Ck}{\alpha' k_C}$$

(k being $-m_1' -(m_1'-1), \ldots -1, +1, \ldots +(m_2'-1)$ and $+m_2'$) and $\alpha' k_C$ being a predetermined weight coefficient corresponding to the weight coefficient $C_k$ in the case where only the phase of the sequence of timing signals supplied to the intersymbol interference component eliminating means, and

*vi.* timing signal phase shifting means for shifting the phase of the sequence of timing signals supplied to the intersymbol interference component eliminating means based on the timing signal phase control signal derived from the timing signal phase control signal generating means.

4. An intersymbol interference component eliminating system according to claim 1, wherein the amplitude modulated signal is produced by the amplitude modulation of the carrier wave with a composite digital signal composed of the sequence of digital symbols and the sequence of timing signals and which further includes

*v.* timing signal extracting means for extracting the sequence of timing signals from the demodulated composite digital signal derived from the demodulator, and

*vi.* timing signal eliminating means for eliminating the sequence of timing signals from the demodulated composite digital signal derived from the demodulator by supplying the sequence of timing signals derived from the timing signal eliminating means and supplying the sequence of resulting demodulated digital symbols to the intersymbol interference component eliminating means.

* * * * *